US012780073B2

(12) United States Patent
Stavropoulos

(10) Patent No.: US 12,780,073 B2
(45) Date of Patent: Nov. 3, 2026

(54) COMPACT DEPLOYABLE CARGO BED UNLOADER

(71) Applicant: Peter Stavropoulos, Lynnfield, MA (US)

(72) Inventor: Peter Stavropoulos, Lynnfield, MA (US)

( * ) Notice: Subject to any disclaimer, the term of this patent is extended or adjusted under 35 U.S.C. 154(b) by 71 days.

(21) Appl. No.: 19/058,898

(22) Filed: Feb. 20, 2025

(65) Prior Publication Data

US 2026/0241848 A1 Aug. 20, 2026

(51) Int. Cl.
*B60P 1/38* (2006.01)

(52) U.S. Cl.
CPC .................................... *B60P 1/38* (2013.01)

(58) Field of Classification Search
CPC ....................................... B60P 1/003
USPC ........................................ 414/527
See application file for complete search history.

(56) References Cited

U.S. PATENT DOCUMENTS

| | | | | | |
|---|---|---|---|---|---|
| 49,006 | A * | 7/1865 | Stevens | B60P 1/38 | 298/28 |
| 2,014,019 | A * | 9/1935 | Girl | B60R 5/04 | 414/522 |
| 2,477,707 | A * | 8/1949 | Walz | B60P 1/36 | 56/61 |
| 2,551,368 | A * | 5/1951 | Flinchbaugh | B60P 1/38 | 414/527 |
| 2,563,158 | A * | 8/1951 | Claffey | A01C 3/06 | 414/527 |
| 2,595,395 | A * | 5/1952 | Lavelle | B60P 1/38 | 74/401 |
| 2,808,159 | A * | 10/1957 | Beltran Simo | B60P 1/6454 | 414/499 |
| 3,443,703 | A * | 5/1969 | Matsumoto | B60P 1/006 | 414/539 |
| 3,961,715 | A | 6/1976 | Ellen | | |
| 3,978,996 | A * | 9/1976 | Oltrogge | B60P 1/38 | 296/57.1 |

(Continued)

OTHER PUBLICATIONS

LogicApt Informatics PVT. Ltd., "Patentability Search Report—A Cargo Bed Unloader", Oct. 28, 2024 (30 pages).

(Continued)

*Primary Examiner* — Joseph A Dillon, Jr.
(74) *Attorney, Agent, or Firm* — Harris Beach Murtha Cullina PLLC

(57) ABSTRACT

An apparatus and methods for unloading materials from a vehicle cargo bed including a rotatable cylindrical drum on a spindle mounted between two end plates and driven by an internal tubular motor. A conveyor sheet is selectively wound and unwound about the cylindrical drum. A pair of mounting members secure the apparatus to the vehicle tailgate and a pair of adjustable length support members between the end plates to the vehicle's tailgate latch posts brace the apparatus and prevent undue stress on the unloader and vehicle tailgate. When the tubular motor is activated, the conveyor sheet winds onto the drum, moving loaded materials on the conveyor sheet rearward for efficient unloading or dumping. Both the mounting members and support members may be folded into a stored position generally parallel to the longitudinal axis of the cylindrical drum.

20 Claims, 13 Drawing Sheets

(56) References Cited

U.S. PATENT DOCUMENTS

| | | | | | |
|---|---|---|---|---|---|
| 4,113,122 | A * | 9/1978 | Lutz | B60P 1/365 | 414/521 |
| 4,277,220 | A * | 7/1981 | Wiley | B60P 1/006 | 414/539 |
| 4,629,390 | A * | 12/1986 | Burke | B60P 1/38 | 414/539 |
| 4,749,325 | A * | 6/1988 | Hodgetts | B65G 67/20 | 242/919 |
| 4,760,971 | A * | 8/1988 | Hodgetts | B66D 1/22 | 254/362 |
| 4,887,937 | A * | 12/1989 | Thunnissen | B60P 1/52 | 414/535 |
| 4,892,456 | A * | 1/1990 | Hodgetts | B65G 67/20 | 410/92 |
| 4,948,325 | A * | 8/1990 | Hodgetts | B65G 35/04 | 414/467 |
| 5,156,518 | A * | 10/1992 | VanMatre | B60P 1/38 | 414/509 |
| 5,340,266 | A | 8/1994 | Hodgetts | | |
| 5,653,572 | A * | 8/1997 | Podd, Jr. | B65D 88/62 | 414/813 |
| 5,669,654 | A * | 9/1997 | Eilers | B60P 1/003 | 296/26.11 |
| 5,915,911 | A * | 6/1999 | Hodgetts | B60P 1/38 | 414/527 |
| 6,033,179 | A * | 3/2000 | Abbott | B60P 1/00 | 414/527 |
| 7,320,572 | B2 * | 1/2008 | Smith | B60P 1/38 | 414/813 |
| 7,673,738 | B2 | 3/2010 | McConnell | | |
| 7,846,081 | B2 | 12/2010 | Itoh et al. | | |
| 7,934,594 | B2 * | 5/2011 | Richardson | B65G 23/12 | 198/810.04 |
| 8,348,587 | B2 * | 1/2013 | Fleming | B60P 7/10 | 414/539 |
| 10,207,622 | B2 * | 2/2019 | Sedmina | B60P 1/52 | |
| 11,597,309 | B2 * | 3/2023 | Carlson | B60P 1/006 | |
| 2005/0196259 | A1 * | 9/2005 | Gilson | B60P 1/003 | 414/527 |
| 2008/0038101 | A1 | 2/2008 | Klatt | | |
| 2008/0217948 | A1 * | 9/2008 | Kobelman | B62D 33/0273 | 296/57.1 |
| 2008/0304947 | A1 * | 12/2008 | Stout | B65D 88/62 | 414/527 |
| 2016/0046226 | A1 * | 2/2016 | Caplea, II | B60P 1/38 | 414/812 |
| 2019/0054961 | A1 * | 2/2019 | Ngo | B60R 3/02 | |

OTHER PUBLICATIONS

Dawson Manufacturing LLC, "Truck Mate, Operator's Manual, Parts Manual", Rev. 1—Jul. 1, 2020 (13 pages).

Truck Mate, Truck Mate Installation Instructions, Rev. 01—Jun. 23, 2020 (15 pages).

* cited by examiner

COMPACT DEPLOYABLE CARGO BED UNLOADER

FIELD OF THE INVENTION

This invention relates generally to the handling of cargo and materials in vehicle beds and more particularly to apparatus which operates to unload a wide variety of cargo and materials from the cargo areas of vehicles such as pickup trucks and trailers. More specifically, it is a tailgate-mounted cargo unloading device that uses a rotatable cylindrical drum and a conveyor sheet to transport materials from the vehicle bed to the rear of the vehicle. The apparatus is designed to be easily mounted to a vehicle tailgate and operated using a motor that rotates the drum to wind and unwind the conveyor sheet, effectively moving the material loaded in the bed toward the tailgate for unloading or dumping.

BACKGROUND OF THE INVENTION

Among the types of materials that are commonly carried in the cargo area of a pickup truck or trailer are granular materials such as sand, gravel, dirt and grain; building materials such as lumber, drywall panels, siding panels, bricks, stone and roofing materials; containers such as boxes, buckets, drums and cartons; waste materials such as brush, tree trimmings, scrap, tires and demolition debris; and miscellaneous objects such as firewood, animal feed, hay bales, tools and other items. In many cases, unloading of the truck bed is a difficult and time consuming activity. For example, unloading of sand, gravel, dirt or mulch with a shovel can take a considerable amount of time and require substantial physical labor. Heavier objects are also difficult to unload, particularly those that are carried in the forward end of the cargo area near the cab and must be moved to the tailgate area before they can be unloaded.

Devices which are permanently mounted in the truck bed are impractical because they occupy significant portions of the cargo area and thus reduce its cargo carrying capacity and/or obstruct access to the truck bed. Past efforts to mount a cargo bed unloader on the top of the tailgate have been bulky, heavy and stress the hinge attachment of the tailgate to the vehicle or are not properly stabilized during operation by the truck manufacturer's tailgate support brackets or cables.

SUMMARY OF THE INVENTION

The present invention is directed to a truck bed unloader which permits virtually any load to be quickly and easily unloaded from the cargo area of a truck or trailer. It is the primary goal of the invention to provide an unloader which is structurally sound, motorized, compact, conveniently storable and easily deployed when desired. More specifically, it is an important object of the invention to provide a truck bed unloader which can be quickly and easily installed, deployed on and removed from a truck bed or trailer and has sufficient support to handle typical loads for the vehicle and does not overstress the hinge and supports of the vehicle tailgate.

The present invention relates to an apparatus for unloading materials from the cargo bed of a vehicle. The apparatus includes a rotatable cylindrical drum that houses a tubular motor, allowing controlled rotation of the cylindrical around a central spindle. The spindle is attached to a pair of opposing end plates. A conveyor sheet is attached to the cylindrical drum and may be unwound to extend across a substantial portion of the length and width of the vehicle bed to receive cargo. When the tubular motor is activated, the conveyor sheet winds onto the drum, moving the loaded materials rearward for efficient unloading or dumping.

In accordance with the invention a pair of sturdy mounting brackets are screwed, bolted or otherwise secured to the interior wall of the tailgate sufficiently wide to provide stable support for the vehicle cargo bed unloader apparatus and that do not detract significantly from the cargo carrying capacity of the vehicle or obstruct access to the vehicle bed. A plastic conveyor sheet which can be unrolled onto the bed is wound on a rotatable cylindrical drum mounted between a pair of end plates. The end plates each supporting a mounting member that are extended in parallel fashion to engage the mounting brackets. The cylindrical drum and end plates may be installed simply by inserting the mounting members into the mounting brackets. The mounting brackets and mounting members may have complementary interfering structures, such as protruding or insertable pins that engage with holes or detents on adjacent components. Removal of the apparatus merely requires release of the interfering structures and withdrawal of the mounting members from the mounting brackets.

The apparatus is designed for secure mounting on the vehicle, utilizing adjustable-length support members that brace between the end plates and the vehicle's tailgate latch posts. The adjustable-length support members comprise a support member base that is attached to the end plates adjacent to the spindle. The base further includes a frustoconical portion for seating a cylindrical tube portion of the support member. The base connects to a support member pivot joint that permits the portion of the support member distal of the pivot joint to be folded generally parallel to the drum for convenient storage of the apparatus. The support member further includes a tensioning member between the pivot joint and a threaded rod portion that extends beyond the distal end of the cylindrical tube section. At the distal end of the threaded rod is a fitting to receive the tailgate latch post of the vehicle on the side wall of the cargo bed. A threaded nut on the threaded rod is advanced to set the length of the support member to secure the apparatus on the tailgate during cargo handling operations.

The mounting members may preferably be folded into a stored position and deployed to be parallel to each other and generally perpendicular to the longitudinal axis of the rotating cylindrical drum. Straps or ties may be used to secure the conveyor sheet on the drum and maintain the mounting members and storage members in a compact configuration for convenient storage. Various configurations of power supply are accommodated, including a direct connection to the vehicle's auxiliary power outlet or a rechargeable internal power source.

For enhanced usability, the system may include a remote control for activating the motor, enabling cargo distribution while the vehicle is in motion. Additionally, pivot joints in the mounting and support members allow for compact storage. Safety and reliability features include mounting brackets, locking mechanisms, and complementary interfering structures, such as lock pins and corresponding holes, to prevent accidental disengagement.

Further refinements include straps or ties to secure the conveyor sheet and support members in a stored position, as well as an optional storage bag for convenience. The invention provides a practical and efficient means for unloading vehicle cargo beds, improving ease of operation and reducing manual labor.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION OF THE INVENTION

Figure 1:
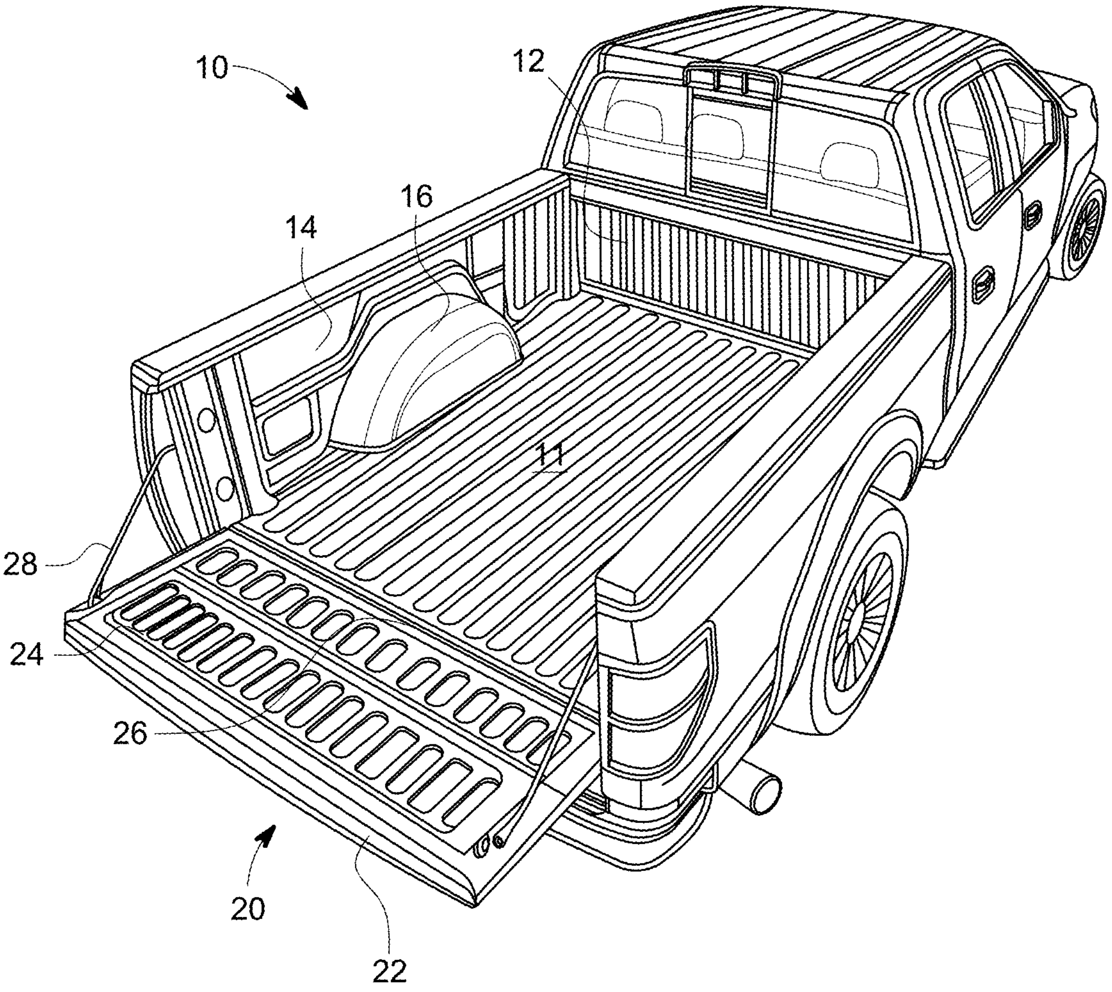
FIG. 1 is a perspective view of the cargo bed of a vehicle having a cargo bed, such as a pickup truck.

The following definitions and methods are provided to better define the present disclosure and to guide those of ordinary skill in the art in the practice of the present disclosure. Unless otherwise noted, terms are to be understood according to conventional usage by those of ordinary skill in the relevant art.

As used in the description, the terms “top,” “bottom,” “above,” “below,” “over,” “under,” “above,” “beneath,” “on top,” “underneath,” “up,” “down,” “upper,” “lower,” “front,” “rear,” “back,” “forward” and “backward” refer to the objects referenced when in the orientation illustrated in the drawings, which orientation is not necessary for achieving the objects of the invention.

The term “about” or “approximately” when immediately preceding a numerical value means a range (e.g., plus or minus 10% of that value). For example, “about 50” can mean 45 to 55, “about 25,000” can mean 22,500 to 27,500, etc., unless the context of the disclosure indicates otherwise, or is inconsistent with such an interpretation. For example, in a list of numerical values such as “about 49, about 50, about 55, . . . ”, “about 50” means a range extending to less than half the interval(s) between the preceding and subsequent values, e.g., more than 49.5 to less than 52.5. Furthermore, the phrases “less than about” a value or “greater than about” a value should be understood in view of the definition of the term “about” provided herein. Similarly, the term “about” when preceding a series of numerical values or a range of values (e.g., “about 10, 20, 30” or “about 10-30”) refers, respectively to all values in the series, or the endpoints of the range.

As used herein, the singular forms “a,” “an,” and “the” include plural referents unless the content clearly dictates otherwise.

The term “comprising” is synonymous with “including,” “having,” “containing,” or “characterized by.” These terms are inclusive and open-ended and do not exclude additional, unrecited elements or method steps.

Unless specified or limited otherwise, the terms “mounted,” “connected,” “supported,” and “coupled” and variations thereof are used broadly and encompass both direct and indirect mountings, connections, supports, and couplings. Further, “connected” and “coupled” are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

Listing of Vehicle Components

Vehicle Cargo bed 10
Base of Cargo bed 11
Back end of Cargo bed 12
Side of Cargo bed 14
Tailgate 20
Top edge of Tailgate 22
Inner wall of Tailgate 24

Tailgate retention cable 25
Tailgate hinge 26
Tailgate retention cable 28
Tailgate latch 30
Tailgate latch post 32
Auxiliary electrical port 40
Listing of Cargo Bed Unloader Components
Cargo Bed Unloader 100
Cylindrical drum 110
Longitudinal axis of cylindrical drum 112
Tubular motor 114
Spindle 116
Conveyor sheet 120
Width of Conveyor sheet 120*w*
Length of Conveyor sheet 120*l*
Conveyor sheet ties 122
End plate 130
Mounting members 140
Mounting member pivot joint 142
Mounting member retention pin 144
Mounting brackets 150
Mounting bracket connectors 152
Mounting bracket retention hole 154
Support member 160
Spindle bracket 161
Support member base 162
Support Member frustoconical fitting 163
Support member cylindrical tube 164
Support member threaded extension 166
Support member distal end fitting 167
U-Shaped distal end fitting 167A
O-Shaped distal end clamp 167B
Support member adjustment nut 168
Support member tensioning element 170
Support member pivot joint 172
Support and mounting member ties 180
Storage bag 190
Power source 200
Auxiliary power cable 210
Remote control 220
First direction wind button 222
Reverse direction unwind button 224

Figure 11:
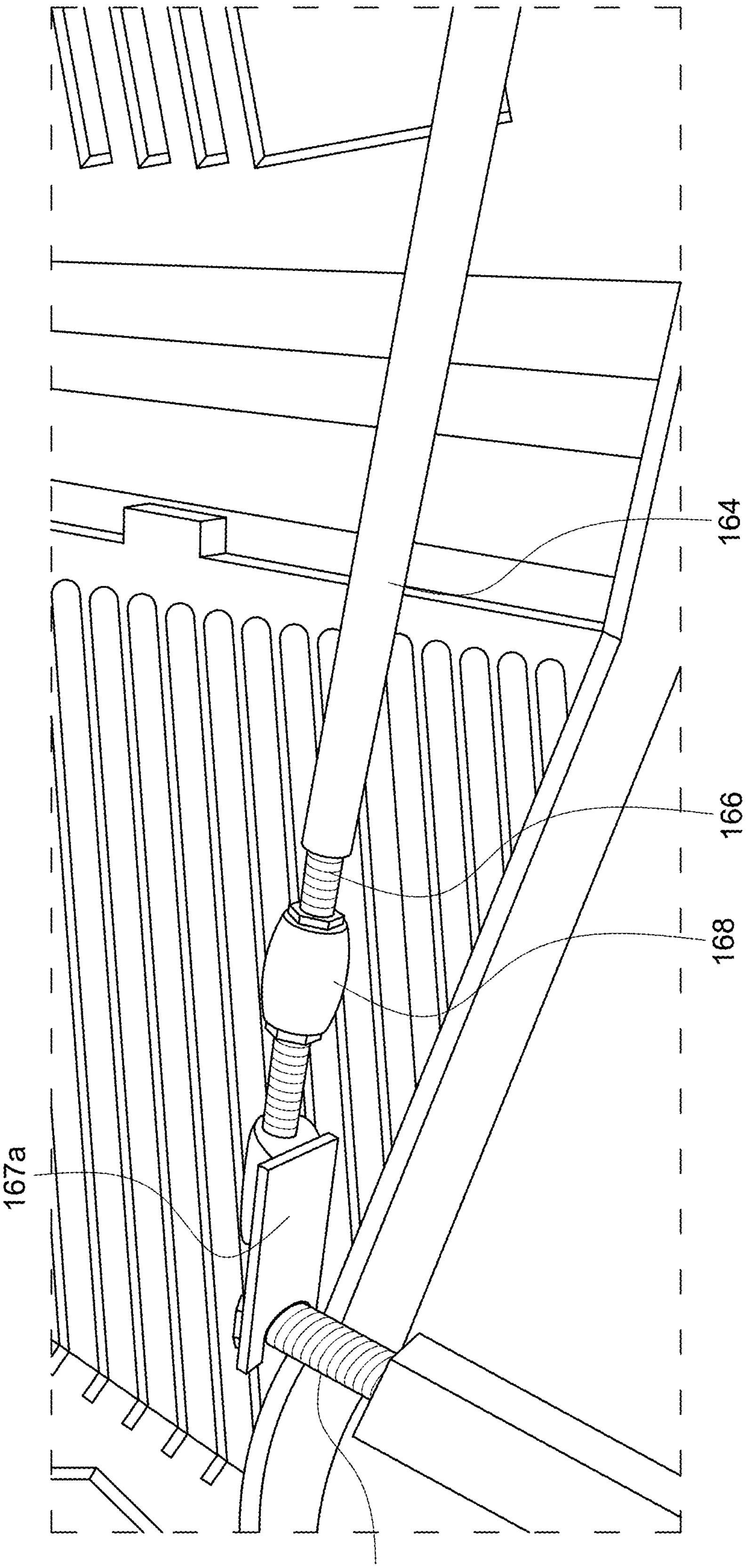
FIG. 11 is a perspective side view of the distal end of the support member engaging the tailgate hitch post and the threaded nut adjacent the distal end of the support member to fix the length of the support member during deployment of the cargo bed unloader in accordance with the present invention.

Referring now to the drawings in detail and initially to FIG. 1, the present invention provides a cargo bed unloader for use with a variety of vehicles that utilize a generally flat cargo bed 10 for the hauling of various goods, such as supplies, packages, gravel, mulch and yard waste. The vehicle can be a truck, trailer, van, SUV or, as shown in FiIG. 1, a pickup truck. Pickup trucks utilize a cargo bed 10 generally located behind a passenger cabin. The cargo bed 10 is generally a box shaped structure with a flat base 11, a forward wall 12 of the bed adjacent the passenger compartment, and two side walls 14 extending perpendicular to the forward wall 12. The side walls 14 may have wheel wells 16 that reduce the workable width of the cargo bed therebetween. At the rear of the bed is typically a tailgate 20, which traditionally pivots at a tailgate hinge 26 between the lower portion of the inner wall 24 of the tailgate and the rearward end of the base 11 of the cargo bed. The tailgate 20 is typically maintained in a closed and locked position by a tailgate latch 30 (FIG. 6) at each side end of the tailgate, which connects to a tailgate latch post 32 (FIG. 11 which may be generally cylindrical or in a U-shape to engage with the complementary structure of the tailgate latch 30. A tailgate retention cable 28 may be attached between the side of the tailgate and the side of the cargo bed to reduce undue strain on the tailgate hinge. Such cables are typically designed to manage the weight of the tailgate as it falls into an open position, however, such cables are not typically designed to handle the working cargo load of the bed. The tailgate retention cable may include a lift assist (not shown) for closing of the tailgate.

Figure 2:
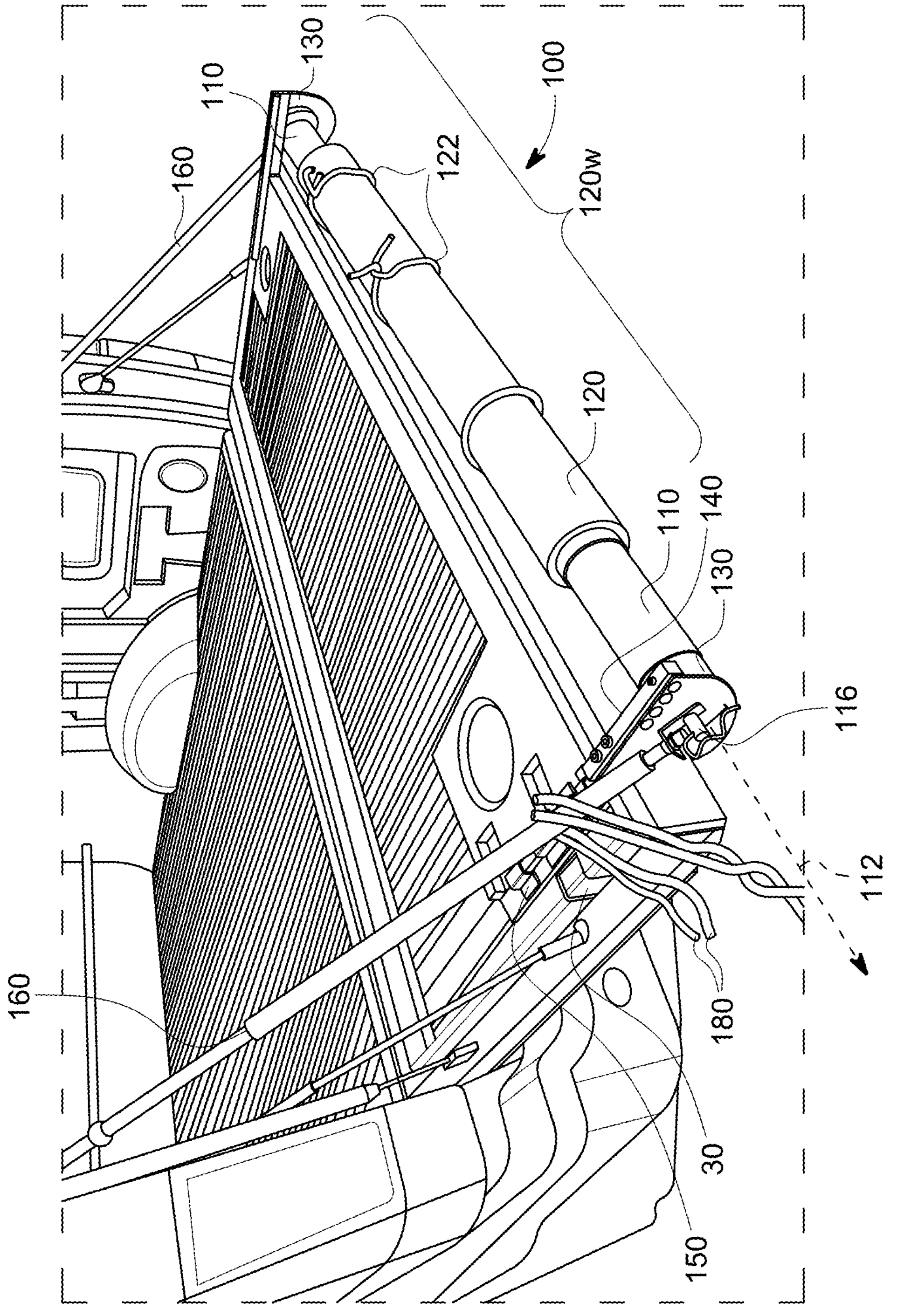
FIG. 2 is a perspective view of the cargo bed unloader of the present invention mounted on the top edge of an open tailgate of a pickup truck.

FIG. 2. Shows a fully installed cargo bed unloader 100 installed at the top edge 22 of the tailgate in the fully deployed position. The cargo bed unloader 100 generally comprises a rotating cylindrical drum 110 having a longitudinal axis 112. Along the axis 112 extends a spindle 116 having opposing ends that mounts the cylindrical drum between two end plates 130. Around the drum is wound a flexible conveyor sheet 120, preferably made from high grade polypropylene fabric having resistance to abrasion and a low coefficient of friction. The inner end of the wound conveyor sheet is anchored or attached to the rotating drum. The cylindrical drum is rotated by use of at least one tubular motor 114 housed within the drum. More than one motor may be housed within the cylindrical drum for increased performance.

End plates 130 support the proximal end of the mounting member 140, which is shown deployed and inserted into the mounting bracket 150 installed on the inner wall 24 of the tailgate 20. The mounting member 140 may include a pivot joint 142 that permits a substantial portion of the length of the mounting member 140 to fold into a position that is generally parallel to the longitudinal axis 112 for compact stowing and storage. A mounting member tie 180 may be deployed to keep the mounting member folded for compact storage when not in use. Adjustable length supporting members 160 extend from adjacent to the spindle 116 and extend therefrom to connect to the tailgate latch post 32. The adjustable length supporting members 160 may comprise several sub-components. The first sub-component is the base 162 of the supporting member, which is attached to one of the end plate 130 or the distal end of the spindle 116. The base 162 extends to a supporting member pivot joint 172 and said base 162 is of sufficient length to clear the end plate 130. The length of the base 162 and location of the pivot joint 172 of the supporting member permits a substantial length of the support member 160 to be folded into a position that is generally parallel to the longitudinal axis 112 of the drum. A support member tie 180 may be deployed to keep the support member folded for compact storage when not in use. A support member tensioning element 170 is attached to the pivot joint and extends to connect to a support member threaded rod 166. The tensioning element 170 is housed within a cylindrical tube 164 of the support member. The base of the support member includes a frustoconical fitting 163 which at its smaller end is less than the inner diameter of the proximal end of the support member cylindrical tube 164 and increases in diameter to a size greater than the inner diameter of the proximal end of the support member cylindrical tube. The distal end of the threaded bar extends beyond the distal end of the cylindrical member, and an internally threaded adjustment nut is mounted on the threaded bar 166. The outer dimensions of the adjustment nut 168 is greater than the inner diameter of the distal end of the cylindrical tube 164. Rotation of the adjustment nut 168 advances or retracts the adjustment nut along the threaded rod 166. Therefore, the placement of the adjustment nut 168 will determine the operable length of the support member when deployed. Adjustment of the length of the pin will be further described below.

The bodies of the tubular motors (not shown) range from 45 mm-92 mm depending on the desired weight capacity to be moved on the conveyor sheet within the cargo bed. The motors may be supplied by rechargeable batteries also housed within the drum or at the end plates, or may supplied through a power cable attached to an auxiliary port adjacent the rear of the vehicle. The 45 mm motor typically can apply motor torque of approximately 25 Nm, which is generally sufficient to move cargo loads of approximately 500-800 lbs. A motor of generally 92 mm can typically generate approximately 60 Nm of torque and transport cargo loads of approximately 2000-2500 lbs. The size of the drum and internal tubular motors can be scaled to move cargo loads from 3000-6000 lbs. or more. Typically, the motors will turn the drum at approximately from 5 to 20 rpm, but preferably at speeds of 9-14 rpm for efficient handling of the cargo.

Figure 3:
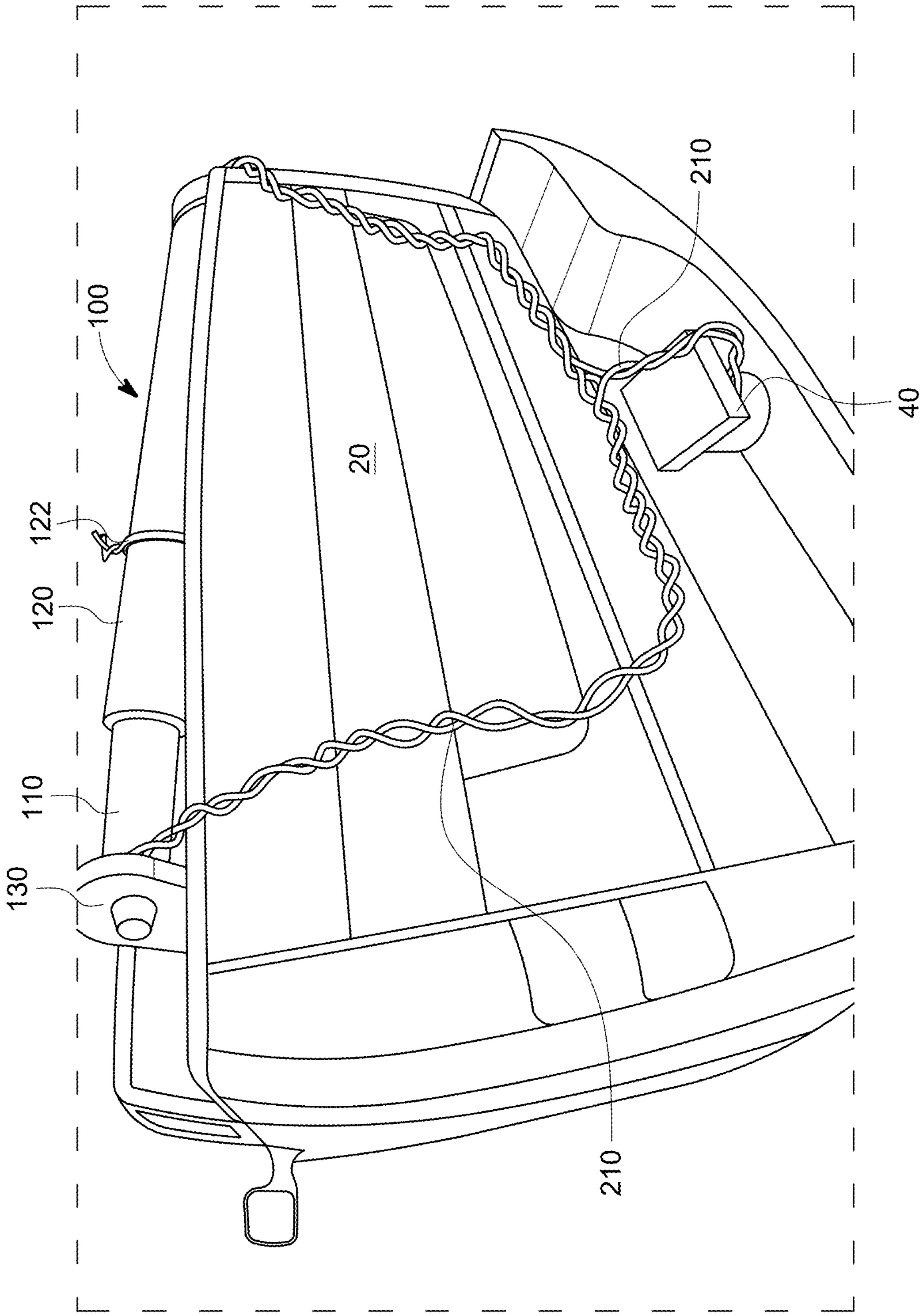
FIG. 3 is a perspective view of the cargo bed unloader of the present invention mounted on the top edge of an open tailgate of a pickup truck.
Figure 4:
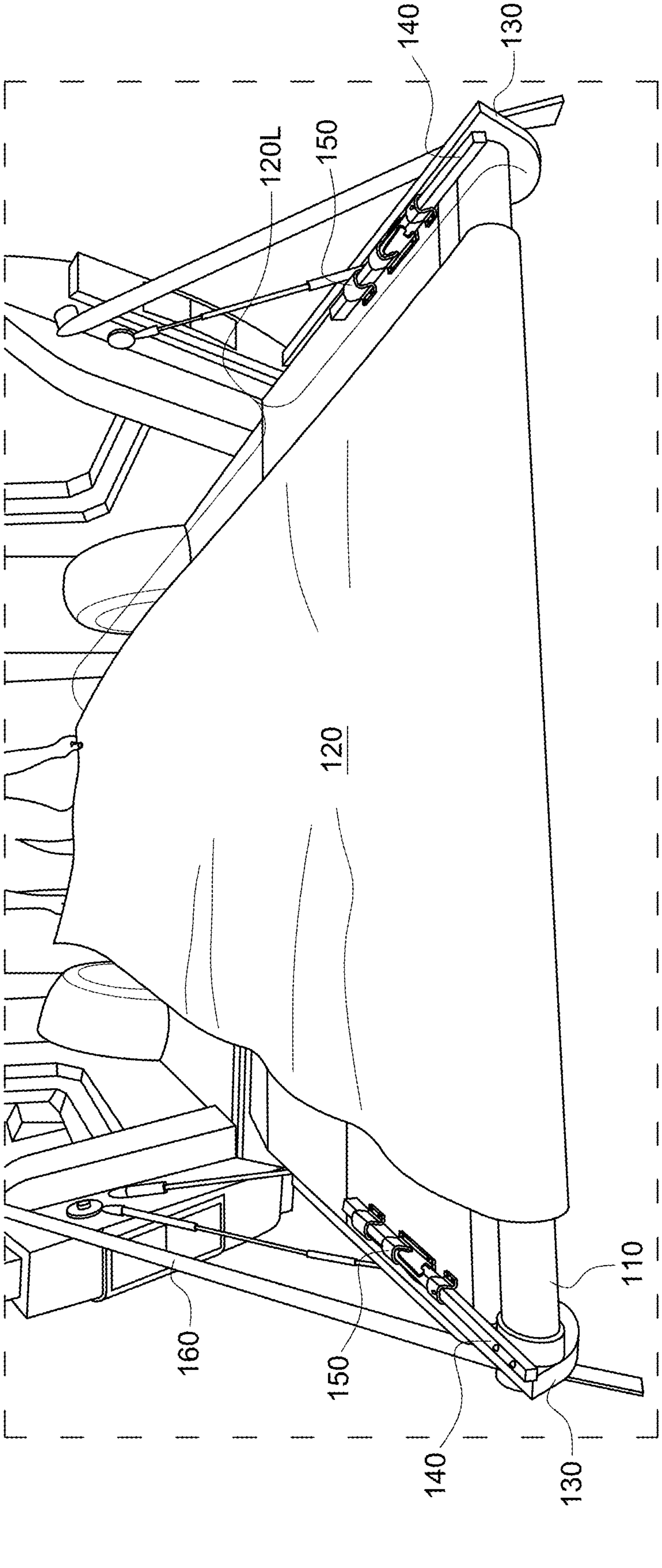
FIG. 4 is an end view of the cargo bed unloader of the present invention mounted on a tailgate with the conveyor sheet deployed over the cargo bed of a pickup truck.

While in FIG. 2, the conveyor sheet 120 is shown fully wound on the cylindrical drum 110 and stowed. Conveyor sheet ties 122 of sufficient length are shown wrapped around the wound conveyor sheet to prevent the inadvertent unwinding of the sheet when not in use. While the unloader unit may be removed during extended periods of non-use, as shown in FIG. 3, the compact nature of the unloader of the present invention allows the unloader unit to remain mounted on the top of the closed tailgate 20 during repeated trips for more cargo. The auxiliary power cable 210 is shown to connect a power source 200 to the internal tubular motors 114 at each end of the cylindrical drum 110. The auxiliary power cables 210 are connected to, for example, a standard 7 pin auxiliary power port 40 adjacent to the trailer hitch at the rear bumper of the pickup truck. Further referring to FIG. 4, the conveyor sheet 120 has been unwound and place over the flat base 11 of the cargo bed. The conveyor sheet has a width 102*w* of approximately the width between the wheel wells 16 protruding into the cargo bed 10, and a conveyor sheet length 120*l* sufficient to reach the front wall 12 of the cargo bed. After of the conveyor sheet 120 is placed over the desired portion of the cargo bed 10, the desired cargo, such as boxes, containers, supplies, granular materials, yard waste or other items may be placed into the cargo bed on top of the unwound conveyer sheet 120. By activation of the internal tubular motor, either manual switches or by remote control 220 having buttons 222, 224 to selectively wind the conveyor sheet over the drum moving the cargo toward the tailgate for unloading, and to unwind the sheet for redeployment in the cargo bed. Additionally, the vehicle may be moved during the operation of the unloader in order to distribute the cargo, such as bags of mulch or loose gravel over a work site.

Figure 5:
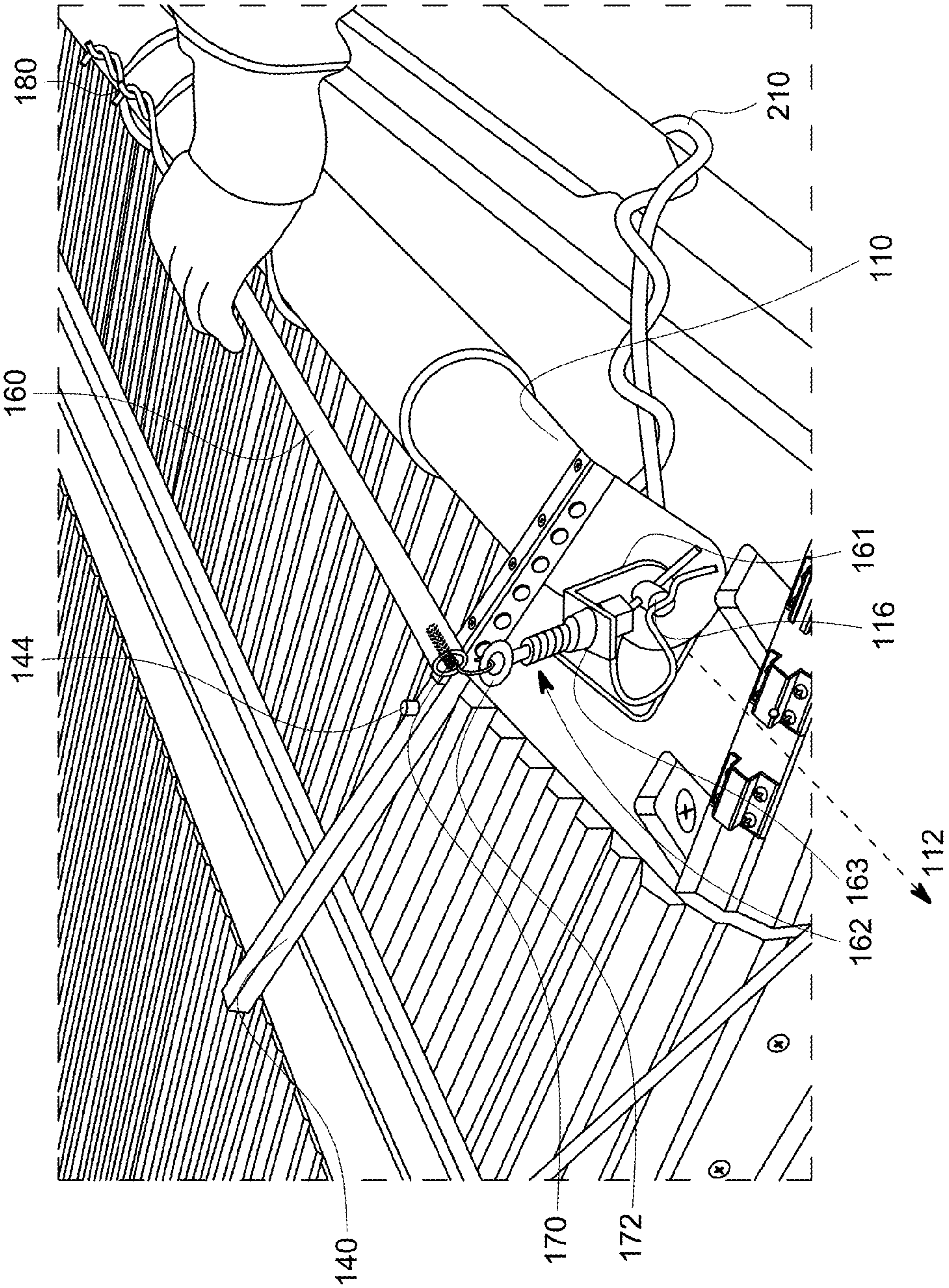
FIG. 5 is a perspective left side view of the end plate with a deployed mounting member and stowed support member of the present invention.
Figure 6:
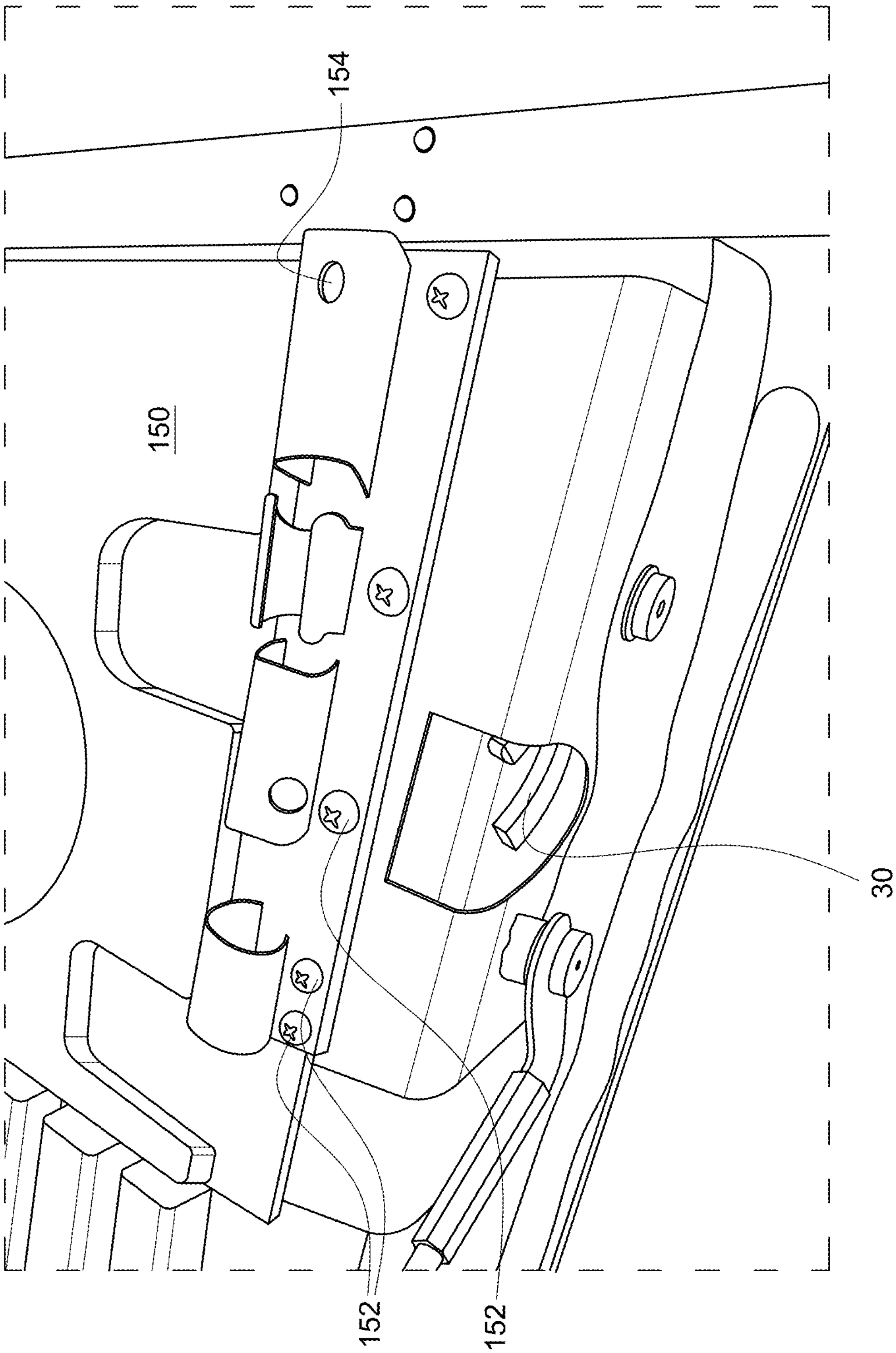
FIG. 6 is a perspective side view of the mounting member installed on the inside of the tailgate in accordance with an embodiment of the present invention.
Figure 7:
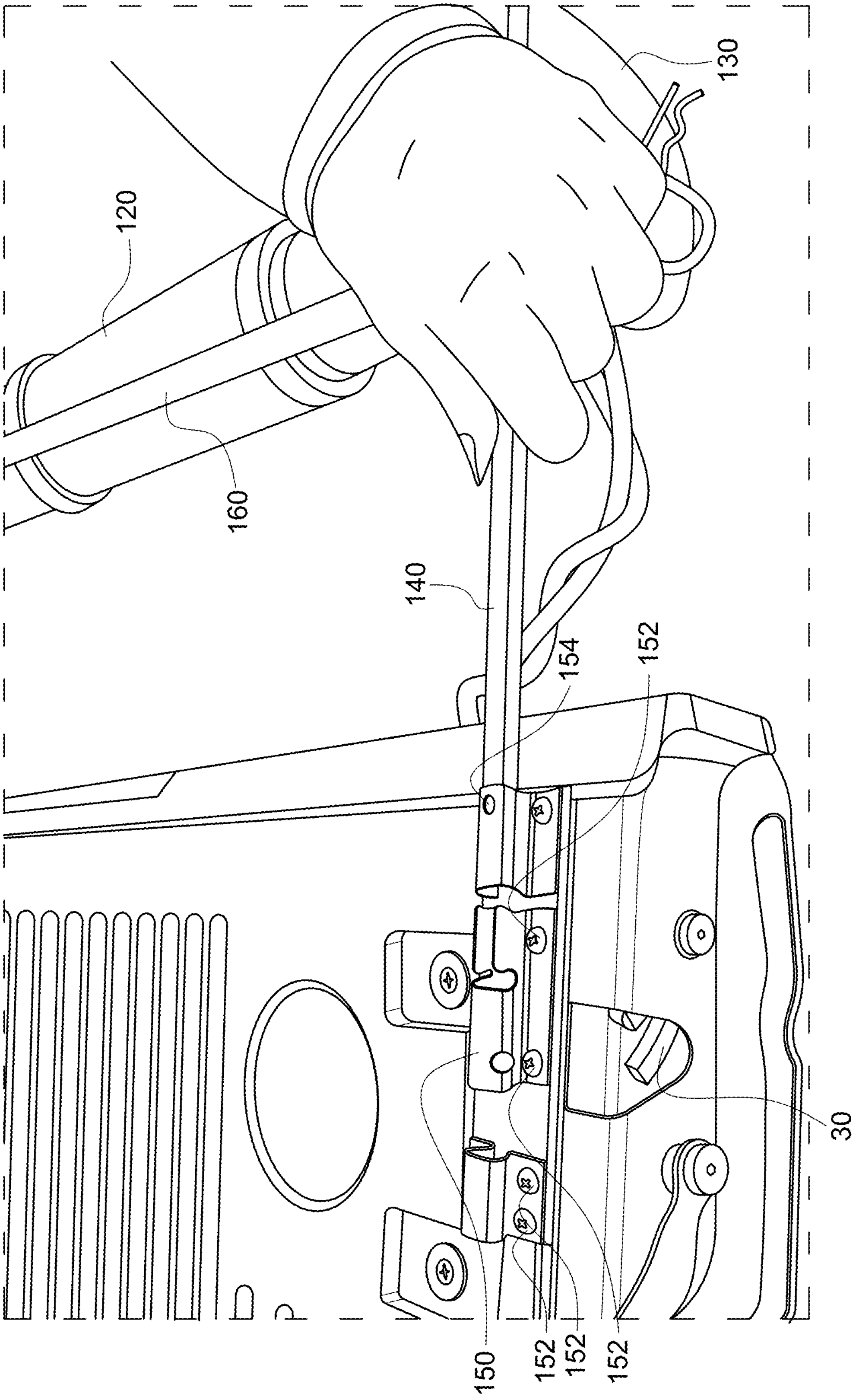
FIG. 7 is a perspective side view of the mounting member being inserted into the mounting bracket in accordance with the present invention.
Figure 8:
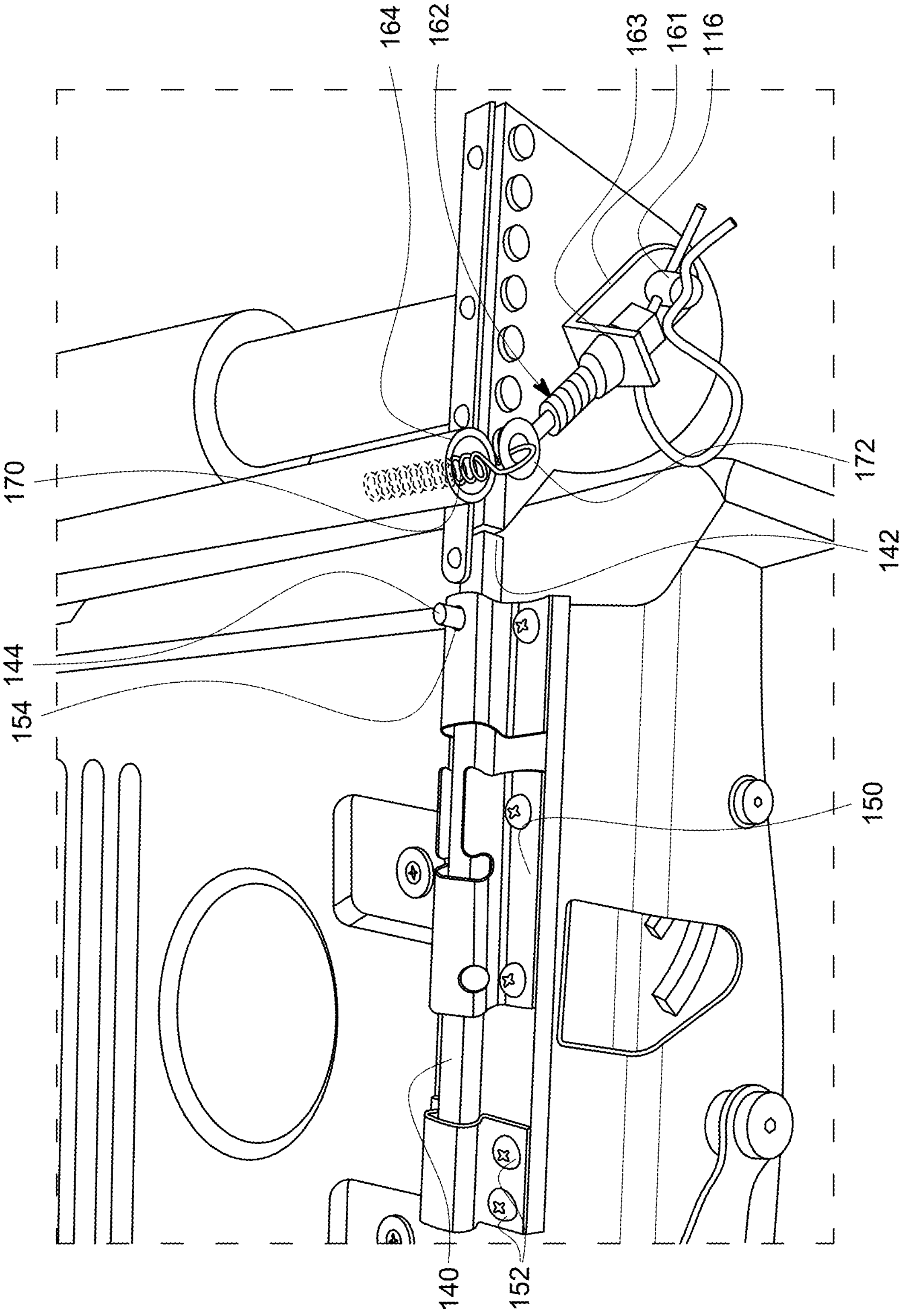
FIG. 8 is a perspective side view of the mounting member fully inserted into the mounting bracket in accordance with the present invention.

With regard to FIGS. 5 through 8, in order to install the cargo bed unloader, the unit is placed on the open tailgate and the mounting members 140 are extended from the stowed position to a position generally perpendicular to the longitudinal axis as shown in FIG. 5. FIG. 6 shows mounting brackets 150 which may be pre-installed at the width of the end plates 130 of the unloader unit. Each mounting bracket 150 may be connected to the inner wall 24 of the tailgate. The mounting bracket 150 defines a slot to receive and capture the extended mounting member 140. The mounting bracket may be attached by connectors 152, such as screws, bolts, rivets, industrial adhesives, or a combination thereof. In an alternative embodiment, the mounting brackets 150 may be incorporated in the internal structure of the tailgate 20 to receive the inserted mounting members 140 through the top of the tailgate 22. AS shown in FIG. 7, the distal end of the mounting member 140 is inserted into the slot formed by the mounting bracket 150. As shown in FIG. 8, the mounting bracket 150 may include a single retention hole 154 or detent. A complementary retention pin 144 or ball, biased to protrude from the surface of the mounting member 140 may engage with the retention hole 154 or detent to retain the mounting member within the mounting bracket. In an alternative embodiment, the mounting bracket 150 may include a through hole, which aligns with a through hole in the mounting member. A retaining pin or cotter pin may be threaded through the corresponding holes to retain the mounting member 140 in the mounting bracket 150.

Figure 9A:
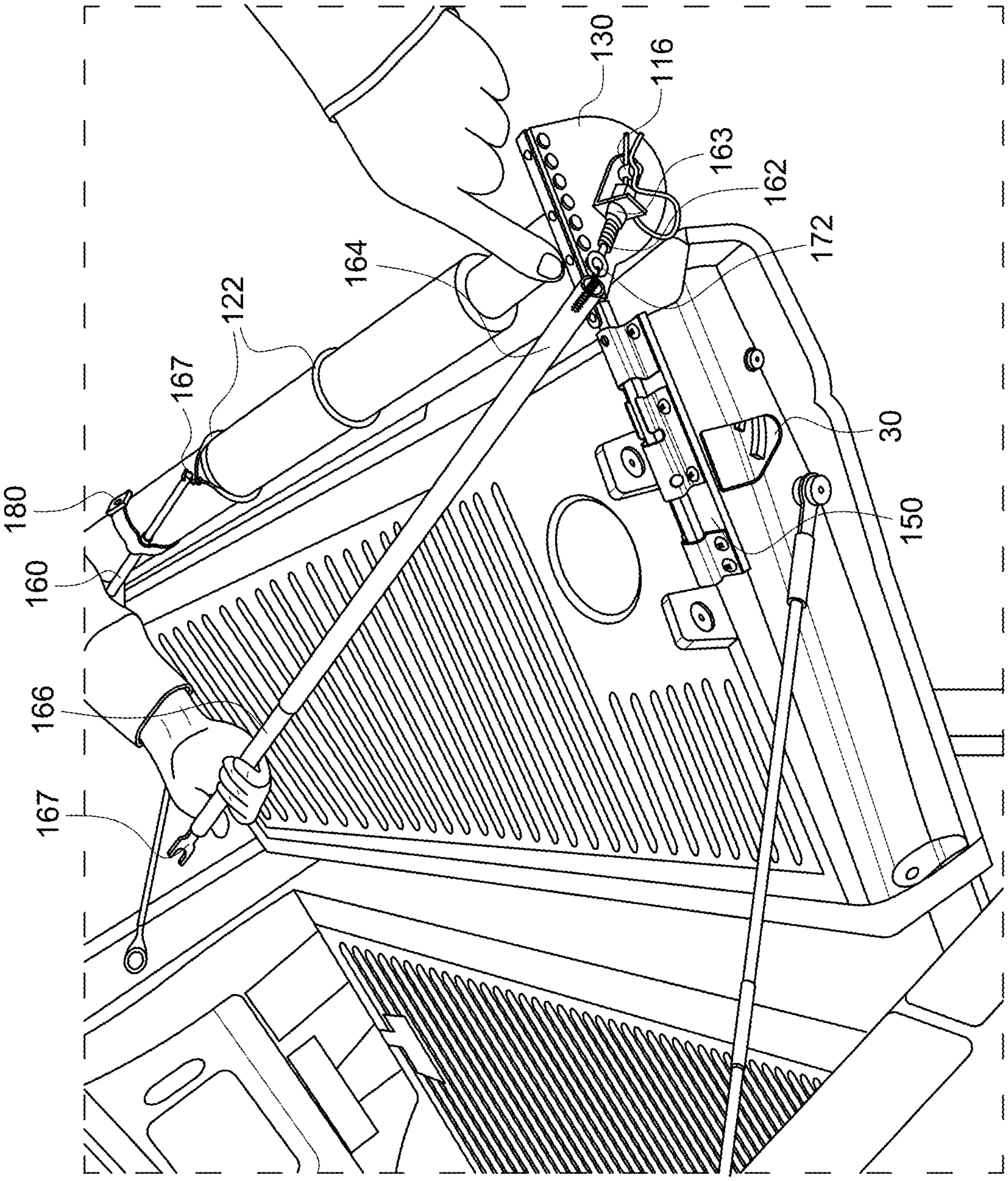
FIG. 9A is a perspective side view of the cargo bed unloader with the support member being rotated from the stowed position at the pivot joint above the base of the support member in accordance with the present invention.
Figure 9B:
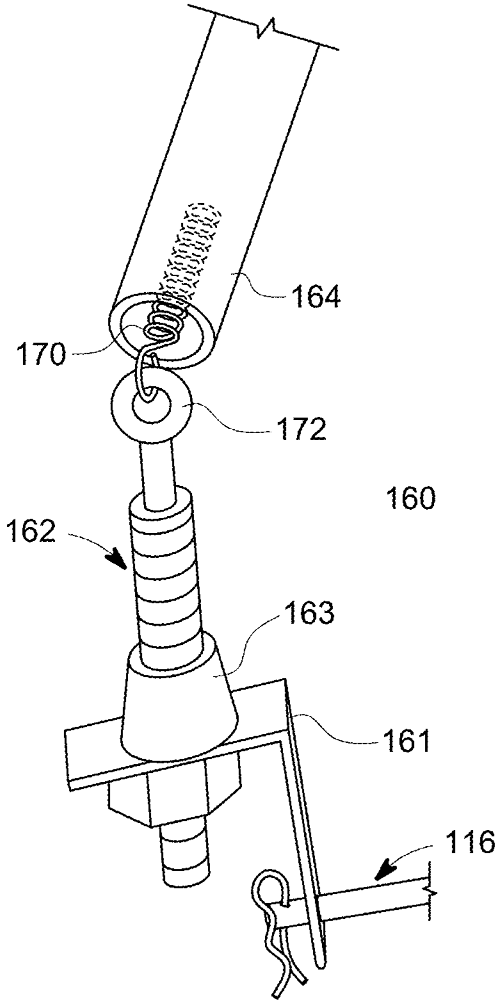
FIG. 9B is an isometric view of the base of the support member and bracket attaching to the spindle.
Figure 10:
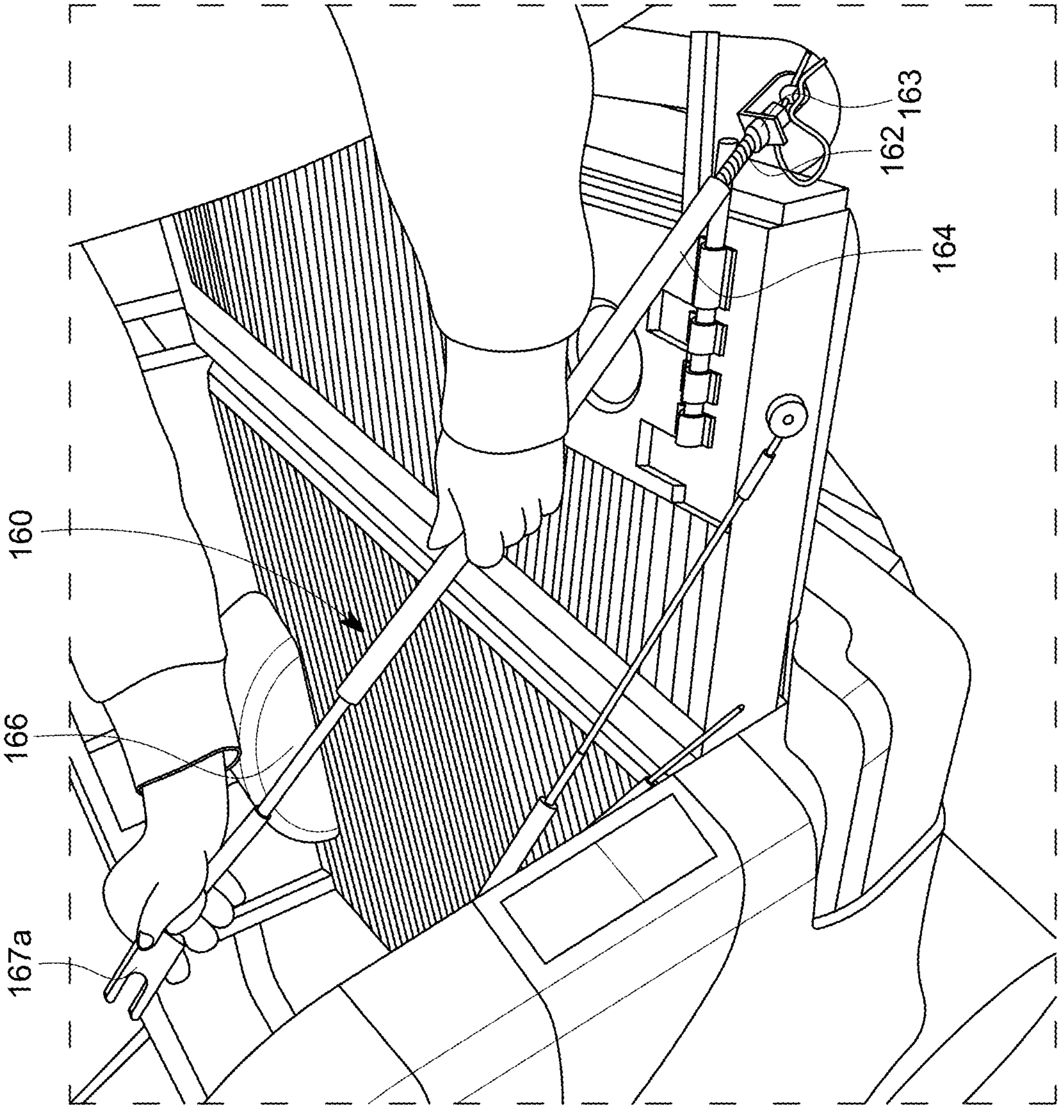
FIG. 10 is a perspective side view of the cargo bed unloader with the support member being extended toward the tailgate hitch post on the side of the cargo bed of a vehicle in accordance with the present invention.
Figure 12A:
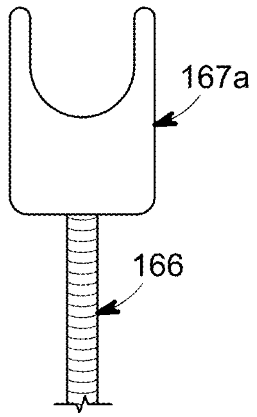
FIG. 12A is a view of an embodiment of an open end bracket at the distal end of the support member.
Figure 12B:
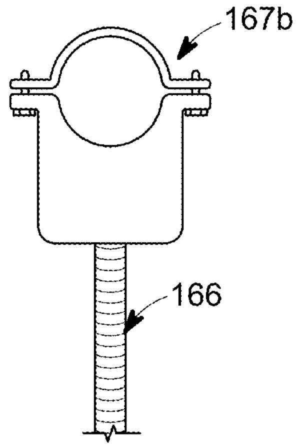
FIG. 12B is a view of another embodiment of a closed bracket at the distal end of the support member in accordance with the present invention.
Figure 13:
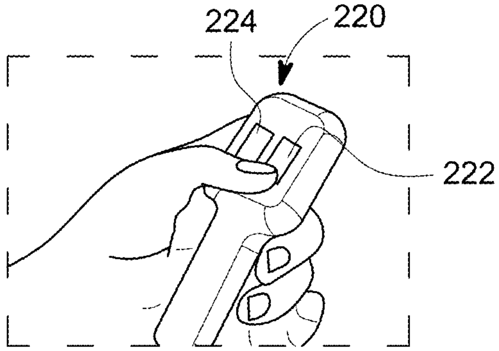
FIG. 13 is a view of an exemplary remote control to operate the cargo bed unloader.
Figure 14:
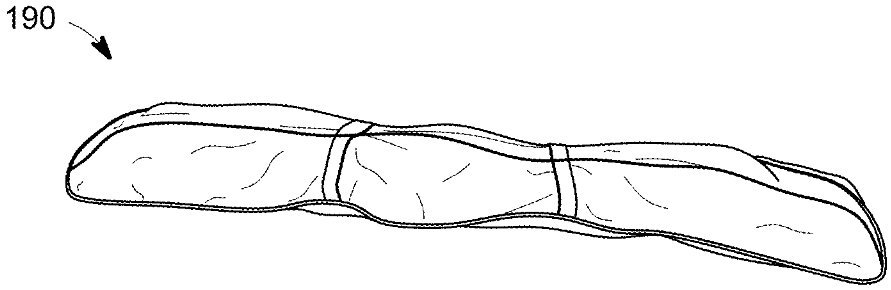
FIG. 14 is a view of an exemplary storage bag.

Engagement of the support member 160 with the tailgate latch post 32 is illustrated in FIGS. 9A through 11. With reference to FIG. 9A, after the mounting members 140 are inserted and locked in the mounting brackets 150, the stowed support members 160 are rotated at the pivot joint 172 into a position toward a position perpendicular to the longitudinal axis 112. FIG. 9B shows further detail of the embodiment of the base member of the support member and its attachment to the spindle 116 by way of an angled bracket 161. The bracket may engage with spindle by keyed opening and retained by the use of cotter pins, retention pins, rings and the like. Once the support member 160 is straightened at the pivot joint 172, the cylindrical tube 164 of the support member is slid onto the supporting member base 162 to seat on the frustoconical fitting 163. With reference to FIG. 10, the threaded rod section 166 of the supporting member is extended against the biasing of the tensioning element 170, until the base of the fitting 167 that may be U-shaped 167A to mate with the tailgate latch post 32 depicted in FIG. 11. In an alternative embodiment shown in FIG. 12B, an O-shaped fitting 167B at the distal end of the support member 160 may be closed and tightened to securely clamp around tailgate latch post 32. After the adjustment of the length of the support member, the threaded adjustment nut 168 is rotated to seat the nut at the distal end of the cylindrical tube 164 of the support member 160. The adjustment nut 168 may be tapered to mate within the cylindrical tube, may have a flat face to abut the end of the cylindrical tube 164, or may have a protruding flange to seat about the end of the cylindrical tube. With the adjustment nut advanced against the cylindrical tube of the support member, the tailgate is protected against undue stress during loading and unloading operations.

The cargo bed unloader 100 may be disengaged by reversing the process described above. Disengagement would include rotating the adjustment nut 168 to provide shorten the support member 160 and disengage the fitting 167 from the tailgate latch post 32. The cylindrical tube 164 may then be slid off the support member base 162 to expose the support member pivot joint 172. The retaining pins 144 or balls on the mounting members are disengaged from the retaining hole 154 or detent and the mounting members 140 are slid out of the mounting brackets 150. The mounting brackets 140 may be folded into the stowed position and retained by ties 180. The support member 150 is then folded in the stowed position parallel to the drum. When both the mounting members 140 and the support members 150 may include pivots 142, 172 a few inches from the attachment to the end plate 130 that permit the folding of the arms approximately 90 degrees so that a substantial length of the mounting member 140 and support members 150 may be place in a position generally parallel to the longitudinal axis 112 of the cylindrical drum 110. Additional mounting member and support member ties 180 may be used to retain the mounting member and support member in the stowed condition for compact folding and storage of the cargo bed unloader when not in use. With the mounting members and the support members stowed, the cargo bed unloader may fit within a long, yet narrow storage bag 190. As the unit is slightly shorter than the width of the tailgate, the storage bag may fit conveniently within the passenger compartment, or under the rear seat in an extended cab pickup truck.

The cargo bed unloader described herein has been shown on a pickup truck, however the unloader may also be mounted on the back of closed box trucks, landscaping trailers, flatbed trailers and cargo trailers of various types. If such trailers do not have tailgates, the unloader unit may be installed on the back bumper or base of the trailer.

Since many possible embodiments may be made of the invention without departing from the scope thereof, it is to be understood that all matter herein set forth or shown in the accompanying drawings is to be interpreted as illustrative and not in a limiting sense.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for unloading materials from a vehicle cargo bed having a back end, opposite sides, and a tailgate hinged to the vehicle cargo bed for movement between an open position and a closed position and having a tailgate latch post on each opposing side of the vehicle cargo bed for securing the tailgate in the closed position, said apparatus comprising:

- a rotatable cylindrical drum having a longitudinal axis, a drum first end and a drum second end;
- a spindle extending from each of the drum first end and the drum second end along the longitudinal axis;
- a tubular motor housed within the cylindrical drum for rotating the cylindrical drum about the spindle;
- a first end plate attached to the spindle at the drum first end and a second end plate attached to the spindle at the drum second end, said first end plate and second end plate supporting the cylindrical drum;
- a conveyor sheet having a first end attached to the cylindrical drum, said conveyor sheet having a length and a width approximating the length and width of the vehicle bed, wherein the conveyor sheet can be selectively wound and unwound about the cylindrical drum by operation of the tubular motor to substantially cover the length and the width of the vehicle bed to receive cargo loaded therein;
- a first mounting member attached to the first end plate and a second mounting member attached to the second end plate, said first and second mounting members extendable to a deployed position wherein the first and second mounting members are generally parallel to each other and perpendicular to the longitudinal axis;
- a first adjustable-length support member and a second adjustable-length support member each having a support member proximal end operatively attached to an end plate, and a support member distal end having a receiving fitting for engaging with the tailgate latch post, each said support member having a locking mechanism to maintain a length of said support member to securely brace between the end plate and the tailgate latch post; and
- a connection for a power source to operating the tubular motor within the cylindrical drum whereby upon activation of the tubular motor to wind the conveyor sheet onto the cylindrical drum the materials loaded in the vehicle bed are moved rearwardly toward the apparatus for unloading or dumping from the vehicle bed.

2. The apparatus of claim 1 further comprising a pair of mounting brackets affixable to the tailgate said mounting brackets configured for receiving the mounting members to secure the apparatus to the tailgate during cargo handling operations thereof.

3. The apparatus of claim 2 wherein each mounting bracket is secured by mechanical connection to an inner wall of the tailgate.

4. The apparatus of claim 1 wherein a rechargeable power source is one of attached to an end plate and contained within the cylindrical drum.

5. The apparatus of claim 1 wherein the connection for a power source comprises a power cable connectable to an auxiliary power outlet of the vehicle.

6. The apparatus of claim 1 further comprising a remote control for activating the tubular motor selectively between a winding and an unwinding rotation.

7. The apparatus of claim 6 wherein the remote control can be activated while the vehicle is in motion to distribute the cargo loaded in the vehicle bed about a work site.

8. The apparatus of claim 1 further comprising a support member pivot joint adjacent to the support member proximal end to permit a substantial portion of the support member to be stored in a position generally parallel to the longitudinal axis of the cylindrical drum.

9. The apparatus of claim 1 further comprising a mounting member pivot joint adjacent to the first end of the mounting member whereby said pivot joint permits folding of a substantial portion of the mounting member in a position generally parallel to the longitudinal axis of the cylindrical drum.

10. The apparatus of claim 1 further comprising complementary interfering structure on a mounting member and on a mounting bracket to prevent inadvertent disengagement of the apparatus when mounted on the tailgate.

11. The apparatus of claim 10 wherein the complementary interfering structure is a depressible lock pin on the mounting member and a corresponding hole in the mounting bracket.

12. The apparatus of claim 1 wherein an adjustable-length support member further comprises an externally threaded rod adjacent the support member distal end and partially housed within a cylindrical tube section, and a threaded nut movable along the threaded rod to set the length of the support member.

13. The apparatus of claim 1 further comprising a strap or tie to secure the support members in a stored position generally parallel to the longitudinal axis of the cylindrical drum.

14. The apparatus of claim 1 further comprising a strap or tie to secure the conveyor sheet around the cylindrical drum in a fully wound position.

15. The apparatus of claim 1 further comprising a bag for storage of the apparatus within the vehicle.

16. A method of unloading cargo materials from a vehicle cargo bed having a back end, opposite sides, and a tailgate hinged to the vehicle cargo bed for movement between an open position and a closed position and having a tailgate latch post on each opposing side of the vehicle cargo bed for securing the tailgate in the closed position, said method comprising:

- securing mounting brackets to an inner surface of said tailgate;
- providing a cargo bed unloader apparatus comprising:

a rotatable cylindrical drum having a longitudinal axis, a drum first end and a drum second end;
a spindle extending from each of the drum first end and the drum second end along the longitudinal axis;
a tubular motor housed within the cylindrical drum for rotating the cylindrical drum about the spindle;
a first end plate attached to the spindle at the drum first end and a second end plate attached to the spindle at the drum second end, said first end plate and second end plate supporting the cylindrical drum;
a conveyor sheet having a first end attached to the cylindrical drum, said conveyor sheet having a length and a width approximating the length and width of the vehicle bed, wherein the conveyor sheet can be selectively wound and unwound about the cylindrical drum by operation of the tubular motor to substantially cover the length and the width of the vehicle bed to receive cargo loaded therein;
a first mounting member attached to the first end plate and a second mounting member second end plate, said first and second mounting members extendable to a deployed position wherein the first and second mounting members are generally parallel to each other and perpendicular to the longitudinal axis;
a first adjustable-length support member and a second adjustable-length support member each having a support member proximal end operatively attached to an end plate, and a support member distal end having a receiving fitting for engaging with the tailgate latch post, each said support member having a locking mechanism to maintain a length of said support member to securely brace between the end plate and the tailgate latch post; and
a connection for a power source to operating the tubular motor within the cylindrical drum;
inserting said mounting members of the cargo bed unloader into said mounting brackets;
engaging said receiving fittings at the distal end of the support members to the tailgate latch posts and fixing the length of the support members to securely brace the cargo bed unloader mounted on the tailgate;
unwinding the conveyor sheet from the cylindrical drum to cover a portion of the cargo bed;
placing cargo materials upon the conveyor sheet;
activating the tubular motor to wind the conveyor sheet around the cylindrical drum to move the cargo materials toward back end of the cargo bed; and
unloading said cargo materials from the back end of the cargo bed.

17. The method of unloading cargo materials from a vehicle cargo bed of claim 16, wherein the mounting brackets are connected to an inner wall of the tailgate.

18. The method of unloading cargo materials from a vehicle cargo bed of claim 16, wherein the mounting brackets are within the tailgate and accessed through openings in a top edge of tailgate.

19. The method of unloading cargo materials from a vehicle cargo bed of claim 16, wherein the mounting members are retained within the mounting bracket by engaging complementary interfering structure on a mounting member and on a mounting bracket to prevent inadvertent disengagement of the cargo bed unloader when mounted on the tailgate.

20. The method of unloading cargo materials from a vehicle cargo bed of claim 16, further comprising the step of deploying the mounting members and support members from a stored position generally parallel to the longitudinal axis of the cylindrical drum to deployed positions wherein said mounting members and support members are generally perpendicular to the axis of the cylindrical drum.

* * * * *